US008775037B2

(12) United States Patent
Kato

(10) Patent No.: US 8,775,037 B2
(45) Date of Patent: Jul. 8, 2014

(54) TRAVEL CONTROLLER

(75) Inventor: Hirokazu Kato, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 13/499,138

(22) PCT Filed: Oct. 22, 2009

(86) PCT No.: PCT/JP2009/068202
§ 371 (c)(1),
(2), (4) Date: Mar. 29, 2012

(87) PCT Pub. No.: WO2011/048688
PCT Pub. Date: Apr. 28, 2011

(65) Prior Publication Data
US 2012/0197497 A1 Aug. 2, 2012

(51) Int. Cl.
G06F 17/00 (2006.01)
F02D 41/00 (2006.01)
F02D 31/00 (2006.01)

(52) U.S. Cl.
USPC .......................... 701/54; 123/339.16; 123/351

(58) Field of Classification Search
CPC ............... B60W 20/00; B60W 10/26; B60W 30/18018; B60W 2710/0644; B60W 2510/0638; B60W 10/10; B60W 30/16; B60W 2510/0652; Y02T 10/6286; B60L 2240/423; F02D 29/06; F02D 41/042; F02D 31/007; F02D 2200/10
USPC ...................... 701/48, 400–541, 2, 53, 54, 72; 340/988–996; 123/339.16, 333, 179.4; 180/65.23, 65.625; 903/930, 902, 945
See application file for complete search history.

(56) References Cited

U.S. PATENT DOCUMENTS 5,508,923 A * 4/1996 Ibamoto et al. ................. 701/70
5,913,910 A   6/1999 Ochi et al.
(Continued)

FOREIGN PATENT DOCUMENTS

DE   100 08 665   8/2001
DE   100 35 027   1/2002
(Continued)

OTHER PUBLICATIONS

International Search Report in International Application No. PCT/JP2009/068202; Mailing Date: Feb. 2, 2010.
(Continued)

Primary Examiner — Muhammad Shafi
(74) Attorney, Agent, or Firm — Finnegan, Henderson, Farabow, Garrett & Dunner, LLP

(57) ABSTRACT

A travel controller which controls the travel of a vehicle includes a road information acquisition unit which acquires road information of a scheduled travel route, a temporary target travel control pattern generation unit which generates a temporary target travel control pattern of the scheduled travel route on the basis of the road information, an engine state transition section estimation unit which estimates an engine state transition section where the state of an engine transits when the vehicle travels using the temporary target travel control pattern, a speed difference calculation unit which calculates a speed difference resulting from variation in engine output in the engine state transition section, a target travel control pattern generation unit which corrects the temporary target travel control pattern on the basis of the speed difference to generate a target travel control pattern, and a travel control unit which performs travel control on the basis of the target travel control pattern.

10 Claims, 6 Drawing Sheets

(56) References Cited

U.S. PATENT DOCUMENTS

| | | | |
|---|---|---|---|
| 2005/0055157 A1 | 3/2005 | Scholl | |
| 2008/0271707 A1* | 11/2008 | Nozaki et al. | 123/446 |
| 2009/0270224 A1* | 10/2009 | Minami | 477/101 |
| 2010/0042282 A1* | 2/2010 | Taguchi et al. | 701/25 |
| 2010/0138090 A1 | 6/2010 | Jinno et al. | |

FOREIGN PATENT DOCUMENTS

| | | |
|---|---|---|
| DE | 196 00 734 | 3/2003 |
| DE | 10 2004 017 115 | 10/2005 |
| DE | 10 2005 047 513 | 4/2007 |
| EP | 1 505 565 | 2/2005 |
| EP | 2 096 612 | 9/2009 |
| JP | 09-132060 | 5/1997 |
| JP | 2001-314004 | 11/2001 |
| JP | 2005-42699 | 2/2005 |
| JP | 2005-67591 | 3/2005 |
| JP | 2007-160991 | 6/2007 |
| JP | 2007-187090 | 7/2007 |
| JP | 2007-291919 | 11/2007 |
| JP | 2008-44522 | 2/2008 |
| JP | 2008-74337 | 4/2008 |
| JP | 2008-129804 | 6/2008 |
| JP | 2008-162490 | 7/2008 |
| JP | 2009-190433 | 8/2009 |

OTHER PUBLICATIONS

English Translation of International Preliminary Report on Patentability of PCT Application No. PCT/JP2009/068202 mailed on May 24, 2012.

Office Action for German Appl. No. 11 2009 005 499.4 dated Jan. 16, 2014.

\* cited by examiner

TRAVEL CONTROLLER

CROSS-REFERENCE TO RELATED APPLICATIONS

This application is a national phase application of International Application No. PCT/JP2009/068202, filed Oct. 22, 2009, the contents of which are incorporated herein by reference.

TECHNICAL FIELD

The present invention relates to a travel controller.

BACKGROUND ART

In the related art, as a device which controls the travel of a vehicle, a device is known which generates a travel control plan and controls the travel of the vehicle on the basis of the generated travel control plan (for example, see Patent Literature 1). The device described in Patent Literature 1 generates the travel control plan (a travel locus pattern, a travel speed pattern, or the like) on the basis of road information or the like, evaluates the travel control plan on the basis of safety, comfort, mileage, or the like, and controls the vehicle on the basis of the travel control plan with excellent evaluation.

CITATION LIST

Patent Literature

[Patent Literature 1] Japanese Unexamined Patent Application Publication No. 2008-129804

SUMMARY OF INVENTION

Technical Problem

As in the travel controller of the related art, when the vehicle is controlled on the basis of the travel control plan, for example, the following method can be used. First, the travel controller detects a vehicle behavior with respect to a vehicle control value. The travel controller feeds back the detected vehicle behavior to the vehicle control value. With this control, even when disturbance which has an influence on the travel of the vehicle occurs, the travel controller can output the vehicle control value to cancel the influence of disturbance. Therefore, the travel controller can enable travel according to the travel control plan as a target.

On the other hand, as a technique for improving the mileage of the vehicle, a technique for controlling the state of the engine is known. In the control of the engine, while the vehicle is traveling or being stopped, some or all of the mechanisms constituting the engine are stopped, and the engine is then started. In this case, the state of the engine discontinuously transits from a stop state to a start state. The discontinuous state transition of the engine becomes disturbance which has an influence on the travel of the vehicle.

When the technique for improving the mileage of the vehicle by controlling the state of the engine is applied to the travel controller of the related art, disturbance occurs due to the stopping of the engine, such that the feedback control amount may increase. If the feedback control amount increases, even when the vehicle travels in accordance with the travel control plan, the mileage may be lowered. For this reason, when the technique for improving the mileage of the vehicle by the stopping of the engine is applied to the travel controller of the related art, the mileage improvement effect may be limited.

Accordingly, the invention has been finalized in order to solve the above-described technical problem, and an object of the invention is to provide a travel controller capable of sufficiently achieving the mileage improvement effect by the stopping of the engine.

Solution to Problem

That is, an aspect of the invention provides a travel controller which controls the travel of a vehicle. The travel controller includes a road information acquisition unit which acquires road information of a scheduled travel route, a temporary target travel control pattern generation unit which generates a temporary target travel control pattern of the scheduled travel route on the basis of the road information, an engine state transition section estimation unit which estimates an engine state transition section where the state of an engine transits when the vehicle travels using the temporary target travel control pattern, a speed difference calculation unit which calculates a speed difference resulting from variation in engine output in the engine state transition section, a target travel control pattern generation unit which corrects the temporary target travel control pattern on the basis of the speed difference to generate a target travel control pattern, and a travel control unit which performs travel control on the basis of the target travel control pattern.

In the travel controller according to the aspect of the invention, the road information acquisition unit acquires the road information of the scheduled travel route. The temporary target travel control pattern generation unit generates the temporary target travel control pattern of the scheduled travel route on the basis of the road information. The engine state transition section estimation unit estimates the engine state transition section which is the section where the state of the engine transits when the vehicle travels using the temporary target travel control pattern. The speed difference calculation unit calculates the speed difference resulting from a variation in the engine output in the engine state transition section. The target travel control pattern generation unit corrects the temporary target travel control pattern on the basis of the speed difference to generate the target travel control pattern. The travel control unit performs travel control on the basis of the target travel control pattern. In this way, in the travel controller according to the aspect of the invention, it is possible to generate the target travel control pattern in which the speed difference resulting from the engine state transition is reflected. For this reason, in the travel controller according to the aspect of the invention, when travel control is performed on the basis of the target travel control pattern, it becomes possible to reduce the difference between the vehicle control value and the target vehicle control value resulting from the engine state transition. Therefore, in the travel controller according to the aspect of the invention, it is possible to sufficiently achieve the mileage improvement effect by the stopping of the engine.

The engine state transition section may be a section where the state of the engine transits from a stop state to a start state. With this configuration, in the travel controller according to the aspect of the invention, it is possible to generate the target travel control pattern in which the speed difference resulting from the discontinuous engine state transition is reflected.

The stop state of the engine may be a state where all mechanisms constituting the engine are stopped. With this configuration, the travel controller according to the aspect of the invention can be applied to, for example, a vehicle having a hybrid system which is travelable in a state where all the mechanisms constituting the engine are stopped.

The stop state of the engine may be a state where some of mechanisms constituting the engine are stopped. With this configuration, the travel controller according to the aspect of the invention can be applied to, for example, a vehicle having a hybrid system which is travelable in a state where some of the mechanisms constituting the engine are stopped.

When the engine is a multicylinder engine, the state where some of the mechanisms constituting the engine are stopped may be a state where some cylinders of the engine are paused. When the engine is a multicylinder engine, the state where some of the mechanisms constituting the engine are stopped may be a state where the driving of intake/exhaust valves in some cylinders of the engine is paused. When the engine is a multicylinder engine, the engine is a multicylinder engine, and the state where some of the mechanisms constituting the engine are stopped may be a state where fuel supply to some cylinders of the engine is paused. With this configuration, the travel controller according to the aspect of the invention can be applied to a vehicle having a hybrid system which is travelable in a state where some of the mechanisms constituting the multicylinder engine are stopped.

The target travel control pattern may be one of a target speed pattern, a target acceleration pattern, and a target jerk pattern.

Advantageous Effects of Invention

According to the travel controller which is the aspect of the invention, it is possible to sufficiently achieve a mileage improvement effect by the stopping of the engine.

DESCRIPTION OF EMBODIMENTS

Figure 1:
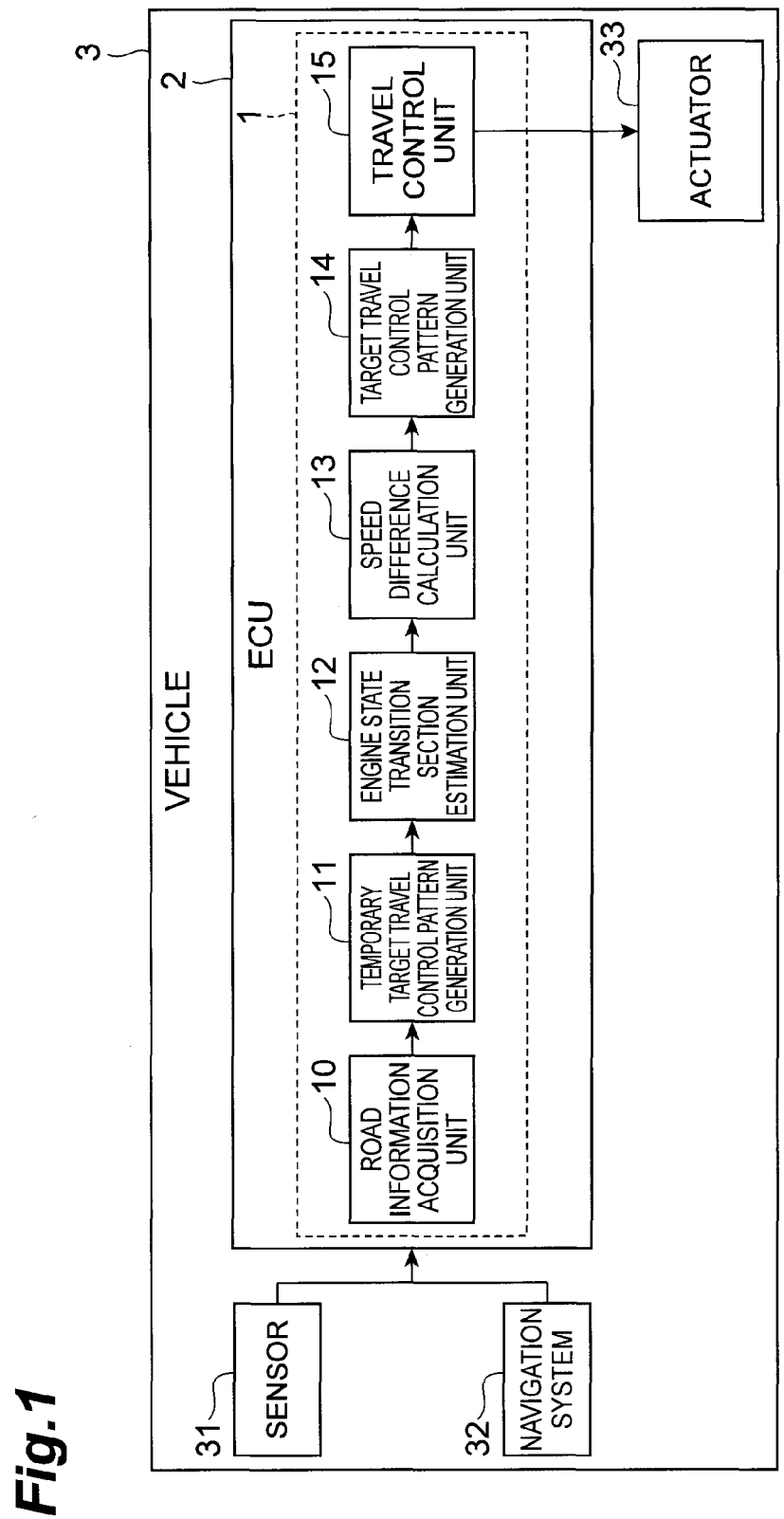
FIG. 1 is a schematic configuration diagram of a vehicle in which a travel controller according to an embodiment of the invention is mounted.

Hereinafter, an embodiment of the invention will be described with reference to the accompanying drawings. In the drawings, the same or equivalent parts are represented by the same reference numerals, and overlapping description will not be repeated.

The travel controller of this embodiment is appropriately used for travel support of, for example, a vehicle in which an engine is used as a power source (including a hybrid vehicle in which an engine and a motor are used as a drive source, and a one motor-type hybrid vehicle).

First, the configuration of the travel controller of this embodiment will be described. FIG. 1 is a block diagram showing the configuration of a vehicle 3 which has a travel controller 1 of an embodiment. The vehicle 3 shown in FIG. 1 includes a sensor 31, a navigation system 32, an ECU (Electronic Control Unit) 2, and an actuator 33. The ECU is a computer of an electronically controlled automobile device, and includes a CPU (Central Processing Unit), a memory, such as a ROM (Read Only Memory) or a RAM (Random Access Memory), an input/output interface, and the like.

The sensor 31 has a function of acquiring travel environment information around the vehicle 3 or road state information of the vehicle 3. As the sensor 31, for example, a speed sensor, an acceleration sensor, a yaw rate sensor, a steering angle sensor, a white line detection sensor, an image camera for monitoring the surroundings of the vehicle 3, an electromagnetic-wave sensor or a millimeter-wave sensor for detecting an obstacle around the vehicle 3 or a succeeding vehicle, and the like are used. The sensor 31 has a function of outputting the acquired information to the ECU 2.

The navigation system 32 has a function of calculating a scheduled travel route to a predetermined point (for example, a destination). For example, the navigation system 32 acquires a point of departure and a destination designated by an operation of the driver or the like, and calculates a travel route from the point of departure to the destination using a map database. For example, the navigation system 32 may acquire the current position of the host vehicle from the GPS (Global Positioning System), and may calculate a scheduled travel route between the current position and the destination. The navigation system 32 has a function of reading the road information of the scheduled travel route from the map database and outputting the road information to the ECU 2. With regard to the map database, a map database which is provided in the navigation system 32 may be used, or a map database which is acquired from an external recording medium or by communication may be used. The road information is information relating to the road, and includes, for example, the shape, gradient, width, frictional coefficient, and the like of the road.

The ECU 2 is connected to the sensor 31 and the navigation system 32, and includes a road information acquisition unit 10, a temporary target travel control pattern generation unit 11, an engine state transition section estimation unit 12, a speed difference calculation unit 13, a target travel control pattern generation unit 14, and a travel control unit 15.

The road information acquisition unit 10 has a function of acquiring the road information of the scheduled travel route. The road information acquisition unit 10 acquires, for example, the road information of the scheduled travel route from the navigation system 32. The road information acquisition unit 10 has a function of outputting the acquired road information to the temporary target travel control pattern generation unit 11.

The temporary target travel control pattern generation unit 11 has a function of generating a temporary target travel control pattern of the scheduled travel route on the basis of the road information output from the road information acquisition unit 10. The temporary target travel control pattern is a target travel control pattern which is temporarily created so as to generate a target travel control pattern to be finally used. That is, the temporary target travel control pattern may be referred to as the initial value of the target travel control pattern. The target travel control pattern is a physical amount depending on the time or distance. As the physical amount, the physical amount of one of speed, acceleration, and jerk may be used. Hereinafter, taking into consideration ease of understanding of the description, description will be provided as to a case where the temporary target travel control pattern is a temporary target speed pattern, and the target travel control pattern is a target speed pattern. The temporary target travel control pattern generation unit 11 has a function of generating the temporary target speed pattern in accordance with, for example, an evaluation function which evaluates a predetermined condition. The predetermined condition refers to, for example, which item of mileage, arrival time, trip time, comfort, such as ride quality, safety, and the like is given preference. For example, a term relating to a time is included in the evaluation function, thereby evaluating the arrival time or trip time. A term for evaluating the engine output is included in the evaluation function, thereby evaluating the mileage. A term for evaluating the maximum horizontal the average horizontal the yaw rate, or the like is included in the evaluation function, thereby evaluating comfort. With regard to safety, a term for evaluating an inter-vehicle distance, the degree of rapid steering, or the like is included in the evaluation function, thereby evaluating safety. The temporary target travel control pattern generation unit 11 has a function of outputting the generated temporary target speed pattern to the engine state transition section estimation unit 12.

The engine state transition section estimation unit 12 has a function of estimating an engine state transition section, which is the section where the engine state transits, on the basis of the temporary target speed pattern output from the temporary target travel control pattern generation unit 11. The state of the engine represents the operation state of the engine. The operation state of the engine includes, for example, a stop state and a start state. The stop state of the engine is a state where some or all of the mechanisms constituting the engine are stopped. In the case of a multicylinder engine, the state where some of the mechanisms constituting the engine are stopped is a state where some cylinders of the engine are paused, a state where the driving of intake/exhaust valves in some cylinders is paused, a state where fuel supply to some cylinders of the engine is paused, or a state where the states are combined. The engine state transition section estimation unit 12 calculates an engine output, which is required so as to attain a target speed, on the basis of the temporary target speed pattern. The engine state transition section estimation unit 12 compares each of the threshold value of the stop state of the engine and the threshold value of the engine output of the start state with the calculated engine output, and estimates a position where the engine state transition occurs. The engine state transition section estimation unit 12 estimates the engine state transition section on the basis of the estimation result. For example, the engine state transition section estimation unit 12 sets a position at a predetermined distance from the position where the engine state transition occurs as the engine state transition section. The engine state transition section may be a distance section or a time section (period). That is, the engine state transition section estimation unit 12 may estimate the time at which the engine state transition occurs, and may set the period when a predetermined time has elapsed from the estimated time as the engine state transition section. The engine state transition section estimation unit 12 has a function of outputting the estimated engine state transition section to the speed difference calculation unit 13.

The speed difference calculation unit 13 has a function of calculating a speed difference resulting from a variation in the output according to the engine state transition. That is, the speed difference calculation unit 13 has a function of calculating an acceleration resulting from a variation in the output according to the engine state transition. For example, the speed difference calculation unit 13 calculates an acceleration from the torque output value of the engine in the engine state transition section. The speed difference calculation unit 13 has a function of outputting the speed difference in the engine state transition section to the target travel control pattern generation unit 14.

The target travel control pattern generation unit 14 has a function of correcting the temporary target speed pattern using the speed difference output from the speed difference calculation unit 13. For example, the target travel control pattern generation unit 14 calculates the speed in the engine state transition section using the speed difference, that is, the acceleration. The target travel control pattern generation unit 14 substitutes the calculated speed in the engine state transition section with the temporary target speed pattern in the speed engine state transition section, and corrects the temporary target speed pattern in the speed engine state transition section. The target travel control pattern generation unit 14 corrects the temporary target speed pattern after the engine state transition section on the basis of the calculated speed in the engine state transition section, and generates the temporary target speed pattern after correction as the target speed pattern. The target travel control pattern generation unit 14 has a function of outputting the generated target speed pattern to the travel control unit 15.

The travel control unit 15 has a function of generating a control value for controlling the actuator 33 on the basis of the scheduled travel route and the target speed pattern output from the target travel control pattern generation unit 14 taking into consideration the behavior of the vehicle 3 such that the position and speed at each time can be fully reproduced. The travel control unit 15 has a function of outputting the generated control value to the actuator 33.

An actuator 38 has actuators, such as motors mounted in an engine, a brake, an electrical power steering, or a hybrid system, and an ECU which controls these actuators. The actuator 38 has a function of receiving the control value from the travel control unit 15 and performing driving control.

Figure 2:
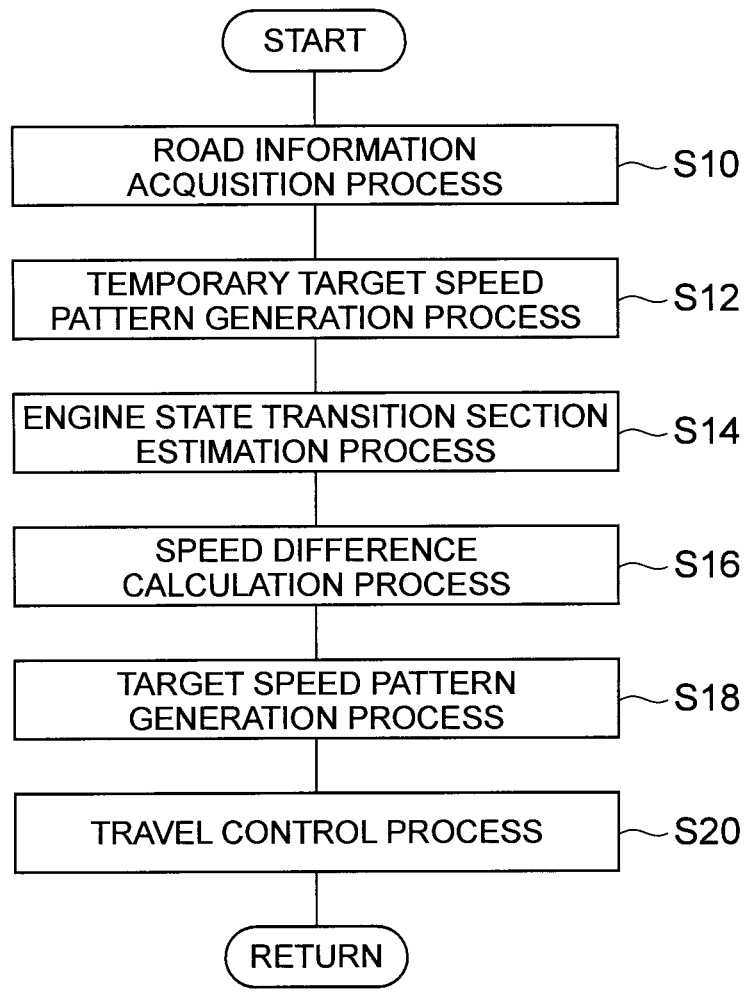
FIG. 2 is a flowchart showing travel control of a travel controller according to an embodiment of the invention.
Figure 3:
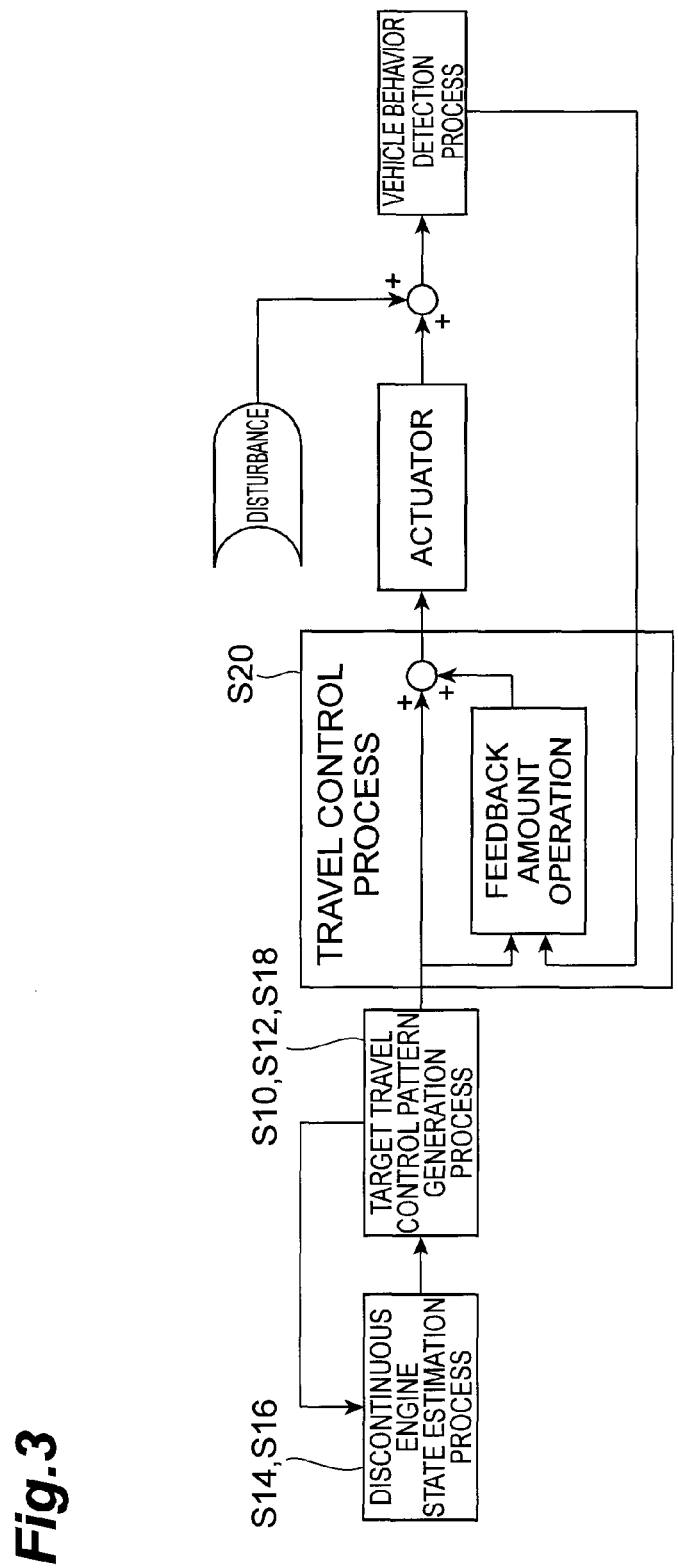
FIG. 3 is a schematic diagram illustrating travel control of a travel controller according to an embodiment of the invention.
Figure 4:
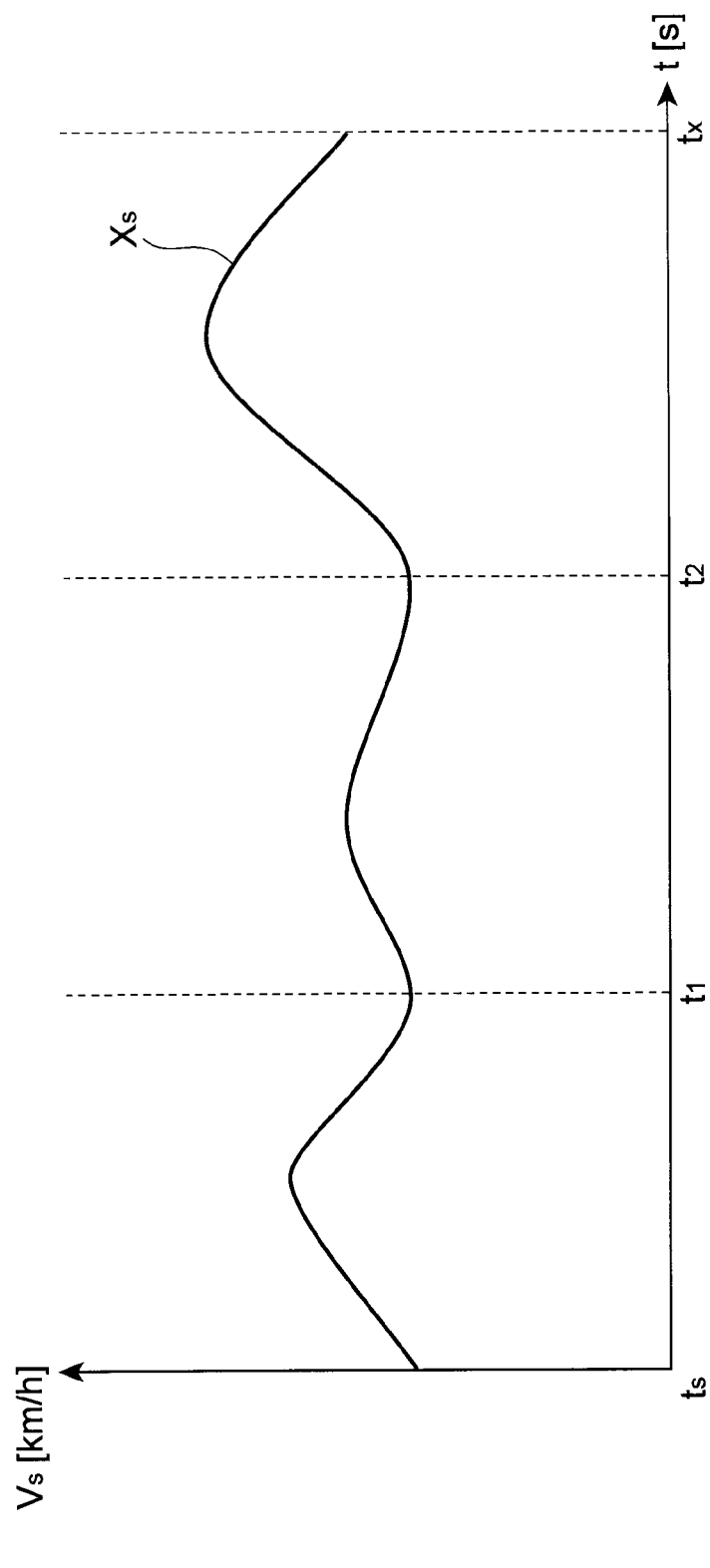
FIG. 4 shows an example of a temporary target speed pattern.
Figure 5:
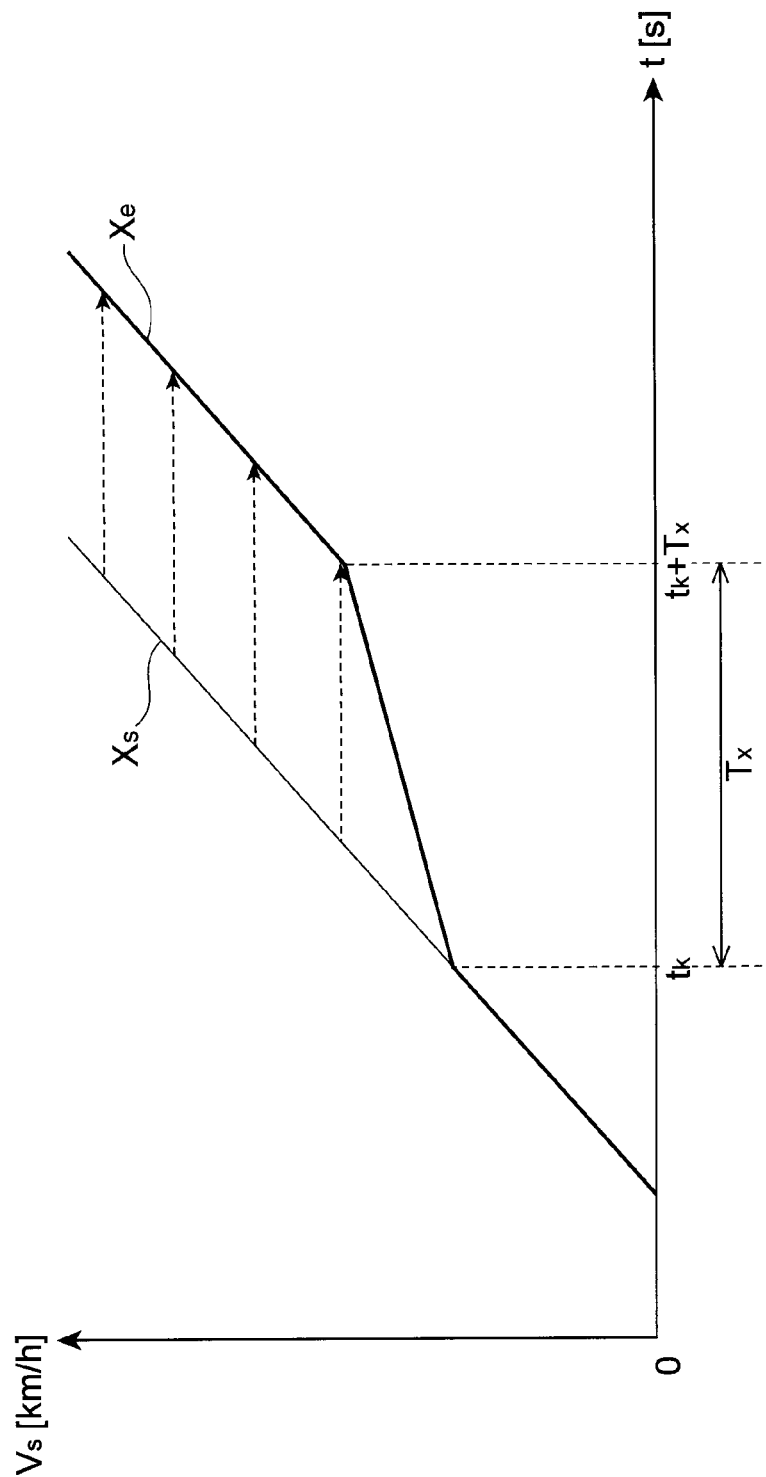
FIG. 5 is a schematic diagram illustrating correction of a temporary target speed pattern.

Next, travel control of the vehicle 3 having the above-described travel controller 1 mounted therein will be described. FIG. 2 is a flowchart showing travel control of the vehicle 3 having the travel controller 1 of this embodiment mounted therein. A control process shown in FIG. 2 is repeatedly performed at a predetermined interval, for example, after ignition is on or the start button of travel control in the vehicle 3 is on. Hereinafter, taking into consideration ease of understanding of the description, the operation of the travel controller 1 will be described with reference to FIGS. 3 to 5. FIG. 3 is a schematic diagram illustrating travel control of the travel controller 1 of this embodiment. FIG. 4 shows an example of a temporary target speed pattern. FIG. 5 is a schematic diagram illustrating correction of a temporary target speed pattern. It is assumed that the vehicle 3 performs engine stop control so as to realize high-mileage travel.

As shown in FIG. 2, the travel controller 1 starts from a road information acquisition process (S10). In the process of S10, the road information acquisition unit 10 acquires the road information of the scheduled travel route. The road information acquisition unit 10 acquires, for example, the shape, gradient, width, frictional coefficient, and the like of the road from the sensor 31 and the navigation system 32 as the road information of the travel route. If the process of S10 ends, a temporary target speed pattern generation process is performed (S12).

In the process of S12, the temporary target travel control pattern generation unit 11 generates the temporary target speed pattern. The temporary target travel control pattern generation unit 11 generates the temporary target speed pattern in accordance with, for example, the evaluation function which evaluates the condition of the mileage. For example, the temporary target travel control pattern generation unit 11 generates the temporary target speed pattern using the evaluation function which evaluates the condition of the mileage such that the vehicle can travel with an acceleration having good engine thermal efficiency. For example, as shown in FIG. 4, if the trip time of the scheduled travel route is the time $t_s$ to $t_x$, a temporary target speed pattern $X_s$ which is a target speed $V_s$ depending on the time $t_s$ to $t_x$ is generated. The time $t_1$ and $t_2$ is the time at which some or all of the mechanisms constituting the engine are stopped for mileage improvement. If the process of S12 ends, an engine state transition section estimation process is performed (S14).

In the process of S14, the engine state transition section estimation unit 12 estimates the engine state transition section. The engine state transition section estimation unit 12 estimates the transition from the stop state of the engine to the start state. The engine state transition section estimation unit 12 calculates the requested power with respect to the engine using, for example, the temporary target speed pattern generated in the process of S12, and compares the requested power with a threshold value for determining the stop state and the start state of the engine. The engine state transition section estimation unit 12 calculates requested power $P_e(t)$ at a predetermined time t with respect to the engine by Expression 1.

$$P_e(t) = T_{ot} \cdot V_t + (W_t + R_t) \cdot L \cdot V_t \quad (1)$$

Here, $V_t$ is a target speed at the time t, $T_{ot}$ is a target torque at the time t, $W_t$ is a road load, $R_t$ is gradient resistance, and L is a wheel diameter. If the threshold value for determining the stop state and the start state of the engine is $P_{sta}$, when Expression 2 is satisfied, the engine state transition section estimation unit 12 estimates that the engine transits from the stop state to the start state.

$$P_e(t-1) < P_{STA} \text{ and } P_e(t) > P_{STA} \quad (2)$$

$P_{sta}$ is calculated from specification information of the vehicle. The engine state transition section estimation unit 12 sets the time satisfying Expression 2 as $t_k$, and estimates a period when the time $T_x$ until the engine starts from the time $t_k$ as the engine state transition section. $T_x$ is the time from when a start command is output to the engine until the start of the engine is completed and in the normal engine operation state. Here, for example, 0.5 seconds is used. If the process of S14 ends, a speed difference calculation process is performed (S16).

In the process of S16, the speed difference calculation unit 13 calculates the speed difference resulting from a variation in the output according to the state transition from the stop state of the engine to the start state. For example, in the case of a hybrid vehicle having an engine and a motor, at the time of the transition from the stop state of the engine to the start state, the engine output value is limited to a predetermined threshold value $P_{lim}$. The speed difference calculation unit 13 calculates the torque $T(t)$ of the vehicle when the engine output value is limited to the predetermined threshold value $P_{lim}$ using Expression 3.

$$T_o(t) = \frac{P_{lim}}{V_t} - (W_T + R_t) \cdot L \quad (3)$$

$P_{lim}$ is calculated from the specification information of the vehicle. The speed difference calculation unit 13 calculates an acceleration a(t) at a predetermined time t using Expression 4.

$$a(t) = \frac{T_o(t)}{L \cdot M} \quad (4)$$

Here, M is the weight of the vehicle 3. With the above, the process of S16 ends. If the process of S16 ends, a target speed pattern generation process is performed (S18).

In the process of S18, the target travel control pattern generation unit 14 corrects the temporary target speed pattern $X_s$ generated in the process of S12 using the speed difference (the acceleration a(t)) generated in the process of S16. For example, as shown in FIG. 5, it is assumed that the engine state transition section estimated in the process of S14 is $t_k$ to $(t_k + T_x)$. In this case, the target travel control pattern generation unit 14 sets the speed obtained by integrating the acceleration a(t) generated in the process of S16 as a target speed pattern $X_e$ in the engine state transition section. With regard to the speed after the time $(t_k + T_x)$, the target travel control pattern generation unit 14 moves the temporary target speed pattern $X_s$ in the horizontal direction and sets the target speed pattern $X_e$ (a broken-line arrow of FIG. 5). That is, the target speed pattern $X_e$ after the time $(t_k + T_x)$ follows the temporary target speed pattern $X_s$ after the time $t_k$.

Through the process of S10 to S18, the target speed pattern taking into consideration the engine state is generated. Here, if the temporary target speed pattern is regarded as the initial value of the target speed pattern, as shown in FIG. 3, the process of S10 to S18 can be broadly classified into two processes of a target travel control pattern generation process (S10, S12, S18) and a discontinuous engine state estimation process (S14, S16).

Next, as shown in FIG. 2, a vehicle control process is performed (S20). The process of S20 is performed by the travel control unit 15, and travel control is performed on the basis of the target speed pattern $X_e$ generated in the process of S18. For example, as shown in FIG. 3, the travel control unit 15 operates the actuator 33 such that the target speed of the target speed pattern $X_e$ is reached. The travel control unit 15 inputs a vehicle behavior (a vehicle behavior when a disturbance, such as a road load, is input) detected by the sensor 31 or the like. The travel control unit 15 calculates a control amount (feedback amount) to cancel the input disturbance on the basis of the detected vehicle behavior, and feeds backs the control amount to the next control value. If the process of S20 ends, the control process shown in FIG. 2 ends.

With the above, the control process shown in FIG. 2 ends. The travel controller 1 performs the control process shown in FIG. 2, thereby generating the target speed pattern taking into consideration a discontinuous change in the engine state. The discontinuous change in the engine state inevitably occurs when engine control is performed so as to realize high-mileage performance. For example, as the engine control for realizing high-mileage performance, in order to reduce unnecessary fuel injection when traveling, control is performed such that a fuel cut is performed when the accelerator is off. For example, in order to reduce pumping loss, engine control is performed such that an intake/exhaust valve is closed while the fuel cut is being performed. Engine control is performed such that idle reduction is automatically performed when the vehicle is stopped. In a hybrid vehicle, control is performed such that the engine is completely stopped during traveling, or control is performed such that, while the engine is not stopped during traveling, the engine is operated with motor power without fuel injection. All kinds of control lead to a discontinuous change (fuel cut and fuel injection, valve open and close, or engine stop and start) in the engine state.

Figure 6:
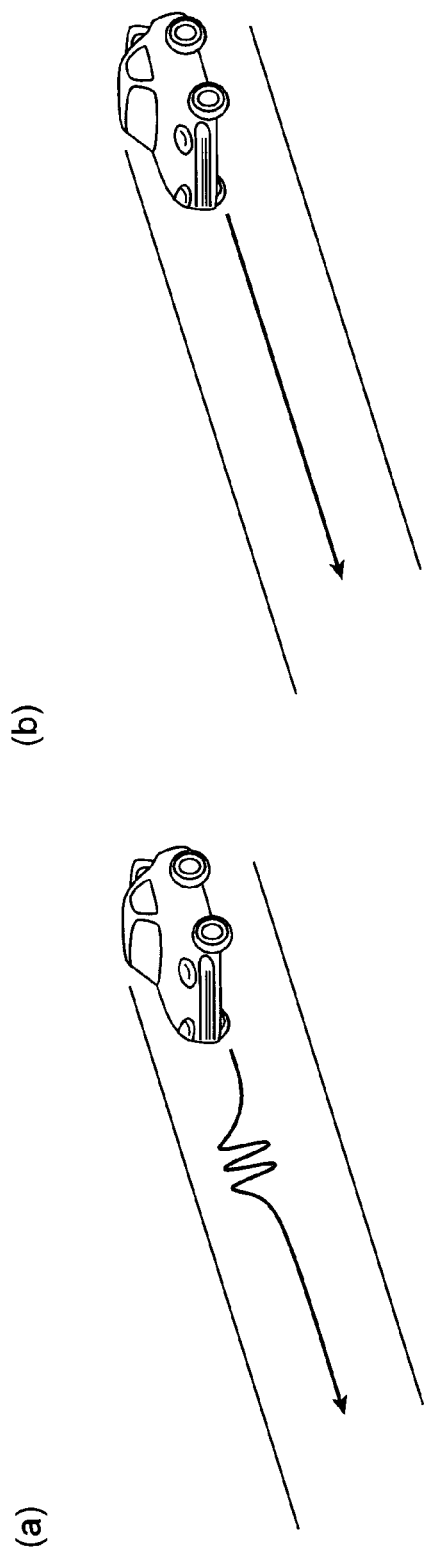
FIG. 6 is a schematic diagram illustrating the effects of a travel controller according to an embodiment of the invention.

The engine undergoes state transition of cranking, fuel injection, ignition, and complete ignition until the engine transits from the stop state to the start state. During this state transition (about 0.5 to 1 second), the engine output is unstable and low compared to the normal state. This is common to all kinds of control which result in a discontinuous change in the engine state. The discontinuous change in the engine state is resolved by feedback control for the target speed pattern. That is, a variation in the engine output associated with a discontinuous change in the engine state is included in the disturbance shown in FIG. 3. However, in this travel control, during the state transition, a large amount of unnecessary fuel injection may be performed or a power source (motor or the like) other than the engine may perform an inefficient operation. For this reason, the mileage improvement effect may be consequently limited. With regard to a discontinuous change in the engine state, the output (acceleration, electrical energy, or the like) as the vehicle may be discontinuous, and this may be inappropriate from the viewpoint of the responsiveness of the vehicle. For example, as shown in FIG. 6($a$), when the engine transits from the stop state to the start state at the time of starting, feedback control for maintaining the speed increases the motor drive power to increase the torque amount, such that the vehicle behavior changes.

In contrast, the travel controller 1 of this embodiment generates the target speed pattern taking into consideration a discontinuous change in the engine state, thereby reducing the feedback amount compared to the related art. For example, when the engine transits from the stop state to the start state at the time of starting, the output power at the time of the start of the engine is limited, and this is taken into consideration by the target speed pattern. For this reason, motor driving is suppressed in advance, and the feedback amount is reduced. While motor driving is suppressed and acceleration is degraded, since the degradation is about 0.5 second, there is little influence on drivability. In this way, if motor driving is suppressed, the torque amount decreases, thereby improving followability and stabilizing the vehicle behavior. If motor driving is suppressed, this can contribute to mileage improvement. A substantive experiment of the inventors shows that, when the vehicle travels using a target travel control pattern taking into consideration the engine state, the mileage is improved by about 10% compared to when the vehicle travels using a target travel control pattern without taking into consideration the engine state.

According to the travel controller 1 of this embodiment, the road information acquisition unit 10 can acquire the road information of the scheduled travel route, and the temporary target travel control pattern generation unit 11 can generate the temporary target speed pattern $X_s$ of the scheduled travel route on the basis of the road information. The engine state transition section estimation unit 12 can estimates the engine state transition section (the section from the time $t_k$ to $t_k+T_x$) which is the section where the engine state transits when the vehicle travels using the temporary target speed pattern $X_s$. The speed difference calculation unit 13 can calculate the speed difference a(t) resulting from a variation in the engine output in the engine state transition section. The target travel control pattern generation unit 14 can correct the temporary target speed pattern $X_s$ on the basis of the speed difference a(t), and can generate the target speed pattern $X_e$. The travel control unit 15 can perform travel control on the basis of the target speed pattern $X_e$. In this way, the travel controller 1 of this embodiment can generate the target speed pattern $X_e$ in which the speed difference a(t) resulting from the engine state transition is reflected. For this reason, when the travel controller 1 of this embodiment performs travel control on the basis of the target speed pattern $X_e$, it becomes possible to reduce the difference between the vehicle control value and the target vehicle control value resulting from the engine state transition. Therefore, the travel controller according to the embodiment of the invention can sufficiently achieve the mileage improvement effect by the stopping of the engine.

The above-described embodiment is an example of the travel controller according to the invention. The travel controller according to the invention is not limited to the travel controller of the embodiment, and the travel controller according to the embodiment may be modified or applied to others within the scope without changing the subject matter described in the appended claims.

For example, although in the above-described embodiment, an example has been described where the travel controller 1 generates the target travel control pattern of the scheduled travel route, the travel controller according to the invention may also be applied to a case where the scheduled travel route is divided at a predetermined distance or a predetermined period of time, and a target travel control pattern is generated in the divided scheduled travel route.

For example, although in the above-described embodiment, an example has been described where the travel controller 1 generates the target travel control pattern of the scheduled travel route, the travel controller according to the invention is not limited thereto. For example, the travel controller according to the invention may also be applied to a case where not only a target travel control pattern but also a scheduled travel route, that is, a travel locus is corrected taking into consideration a discontinuous engine operation state.

For example, although in the above-described embodiment, an example has been described where the engine operation state transits from the stop state to the start state, the travel controller according to the invention is not limited thereto. For example, the travel controller according to the invention may also be applied to a case where the engine operation state transits from the start state to the stop state, in short, a case where the engine operation state is discontinuous.

For example, although in the above-described embodiment, an example has been described where the travel controller 1 includes the speed difference calculation unit 13, and corrects the target speed pattern using the speed difference, the travel controller according to the invention is not limited thereto. For example, the travel controller according to the invention may correct a target acceleration pattern or a target jerk pattern using a speed difference, or may correct a target speed pattern, a target acceleration pattern, or a target jerk pattern using an acceleration difference or a jerk difference.

For example, although in the above-described embodiment, an example has been described where the road information is acquired from the navigation system 32, the invention is not limited thereto. For example, the vehicle 3 may include a road-side support device (for example, an optical beacon or the like) which is arranged on the road side or a communication device which is communicable with a peripheral device or the like. The ECU 2 may acquire the road information of the scheduled travel route from the communication device.

REFERENCE SIGNS LIST

1: travel controller, 2: ECU, 3: vehicle, 10: road information acquisition unit, 11: temporary target travel control pattern generation unit, 12: engine state transition section estimation unit, 13: speed difference calculation unit, 14: target travel control pattern generation unit, 15: travel control unit, 31: sensor, 32: navigation system, 33: actuator.

The invention claimed is:

1. A travel controller which controls the travel of a vehicle, the travel controller comprising:
   a road information acquisition unit which acquires road information of a scheduled travel route;
   a temporary target travel control pattern generation unit which generates a temporary target travel control pattern of the scheduled travel route on the basis of the road information;
   an engine state transition section estimation unit which estimates an engine state transition section where the state of an engine transits from a stop state to a start state or from the start state to the stop state on the basis of an engine output for attaining a target speed in the temporary speed pattern when the vehicle travels using the temporary target travel control pattern;
   a speed difference calculation unit which
   calculates variation in engine output resulting from limiting engine output, wherein the engine output is limited when the state of an engine transits in the engine state transition section, and
   calculates a speed difference resulting from variation in engine output;
   a target travel control pattern generation unit which corrects the temporary target travel control pattern on the basis of the speed difference to generate a target travel control pattern; and
   a travel control unit which performs travel control on the basis of the target travel control pattern.

2. The travel controller according to claim 1,
   wherein the engine state transition section is a section where the state of the engine transits from a stop state to a start state.

3. The travel controller according to claim 2,
   wherein the stop state of the engine is a state where all mechanisms constituting the engine are stopped.

4. The travel controller according to claim 2,
   wherein the stop state of the engine is a state where some of mechanisms constituting the engine are stopped.

5. The travel controller according to claim 4,
   wherein the engine is a multicylinder engine, and the state where some of the mechanisms constituting the engine are stopped is a state where some cylinders of the engine are paused.

6. The travel controller according to claim 4,
   wherein the engine is a multicylinder engine, and the state where some of the mechanisms constituting the engine are stopped is a state where the driving of intake/exhaust valves in some cylinders of the engine is paused.

7. The travel controller according to claim 4,
   wherein the engine is a multicylinder engine, and the state where some of the mechanisms constituting the engine are stopped is a state where fuel supply to some cylinders of the engine is paused.

8. The travel controller according to claim 1,
   wherein the target travel control pattern is a target speed pattern.

9. The travel controller according to claim 1,
   wherein the target travel control pattern is a target acceleration pattern.

10. The travel controller according to claim 1,
    wherein the target travel control pattern is a target jerk pattern.

\* \* \* \* \*